(12) United States Patent
Yokota et al.

(10) Patent No.: US 9,187,116 B2
(45) Date of Patent: Nov. 17, 2015

(54) STEERING APPARATUS

(71) Applicant: YAMADA MANUFACTURING CO., LTD., Kiryu-shi (JP)

(72) Inventors: Norihiko Yokota, Kiryu (JP); Toru Ito, Kiryu (JP); Noriyuki Watanabe, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 0 days.

(21) Appl. No.: 14/606,865

(22) Filed: Jan. 27, 2015

(65) Prior Publication Data

US 2015/0232116 A1  Aug. 20, 2015

(30) Foreign Application Priority Data

Feb. 19, 2014  (JP) ................................. 2014-030087

(51) Int. Cl.
  *B62D 1/19*  (2006.01)
  *B62D 1/185*  (2006.01)
  *B62D 1/184*  (2006.01)

(52) U.S. Cl.
  CPC .............. *B62D 1/185* (2013.01); *B62D 1/184* (2013.01); *B62D 1/19* (2013.01); *B62D 1/192* (2013.01)

(58) Field of Classification Search
  CPC combination set(s) only.
  See application file for complete search history.

(56) References Cited

U.S. PATENT DOCUMENTS

| | | | |
|---|---|---|---|
| 5,476,284 A * | 12/1995 | DuRocher et al. | 280/777 |
| 6,419,269 B1 * | 7/2002 | Manwaring et al. | 280/775 |
| 7,726,691 B2 * | 6/2010 | Yamada | 280/775 |
| 8,443,696 B2 * | 5/2013 | Schnitzer et al. | 74/493 |
| 8,474,869 B2 * | 7/2013 | Sulser et al. | 280/777 |
| 8,550,497 B2 * | 10/2013 | Takezawa et al. | 280/775 |
| 8,984,984 B2 * | 3/2015 | Yokota et al. | 74/493 |
| 2008/0217901 A1 * | 9/2008 | Olgren et al. | 280/775 |
| 2015/0069747 A1 * | 3/2015 | Sharman et al. | 280/777 |

FOREIGN PATENT DOCUMENTS

DE  102011056351  *  6/2013
JP  2002-337699 A  11/2002

* cited by examiner

*Primary Examiner* — Nicole Verley
(74) *Attorney, Agent, or Firm* — McGinn IP Law Group, PLLC

(57) ABSTRACT

A steering apparatus includes: a column pipe; an outer column having an embracing main body portion that allows the column pipe to freely move in a front-rear direction and fixes the column pipe; and clamping portions that extend and contract the embracing main body portion in a diametric direction; a fixing bracket having a fixing side portion that holds widthwise opposite sides of the outer column in a sandwiching manner; a stopper bracket having an telescopic slot secured to the column pipe and an impact absorbing slot and having a collapse portion, the telescopic slot and the impact absorbing slot being contiguously formed along an axial direction; and a clamper having a bolt shaft inserted through the clamping portions, the fixing side portion, and the stopper bracket and collapsing the collapse portion.

11 Claims, 8 Drawing Sheets

ENLARGED CROSS-SECTIONAL VIEW TAKEN ALONG LINE X1-X1

ENLARGED CROSS-SECTIONAL VIEW TAKEN ALONG LINE Y1-Y1

Fig.5A
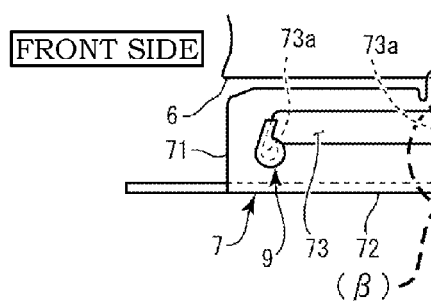
Fig.5B
ENLARGED VIEW OF (β) PORTION
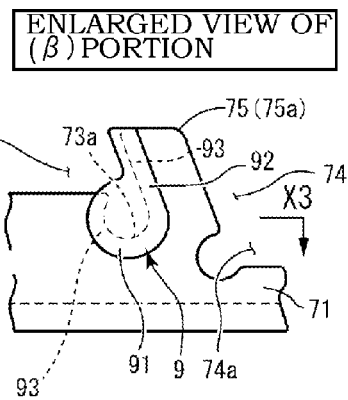
Fig.5D
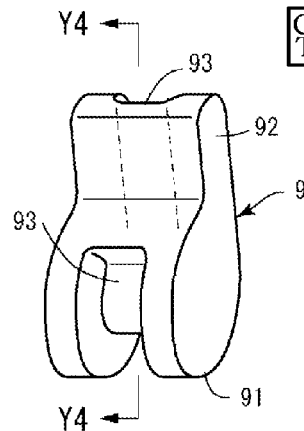
Fig.5E
CROSS-SECTIONAL VIEW TAKEN ALONG LINE Y4-Y4
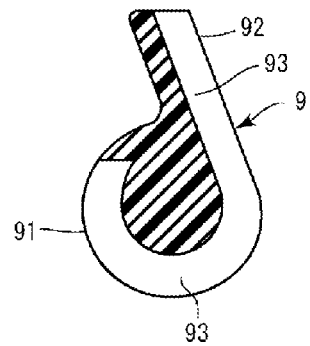
Fig.5C
CROSS-SECTIONAL VIEW TAKEN ALONG LINE X3-X3
Fig.5F
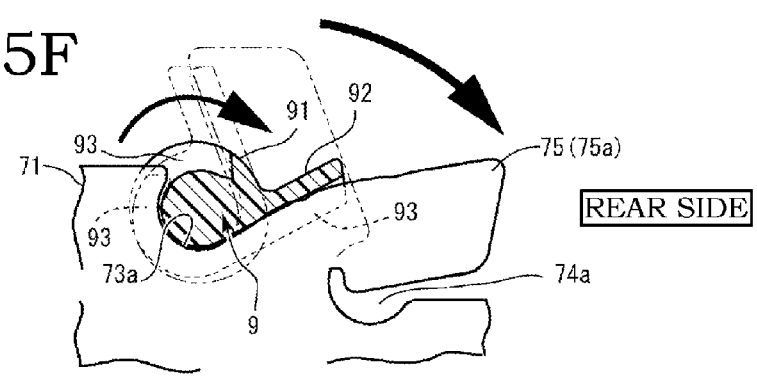

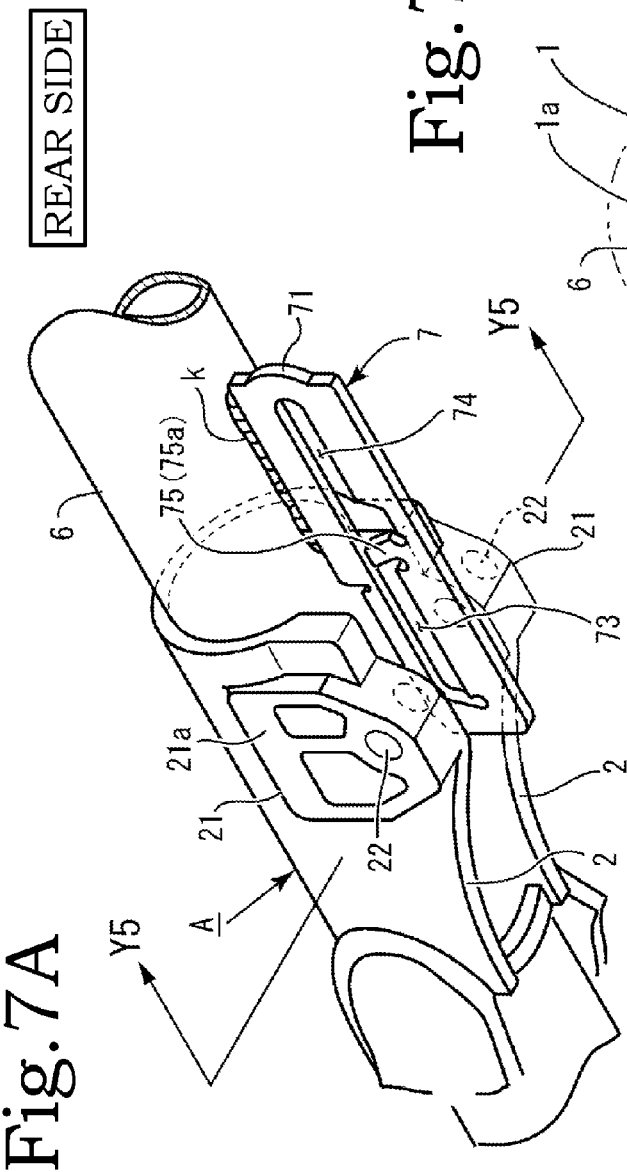
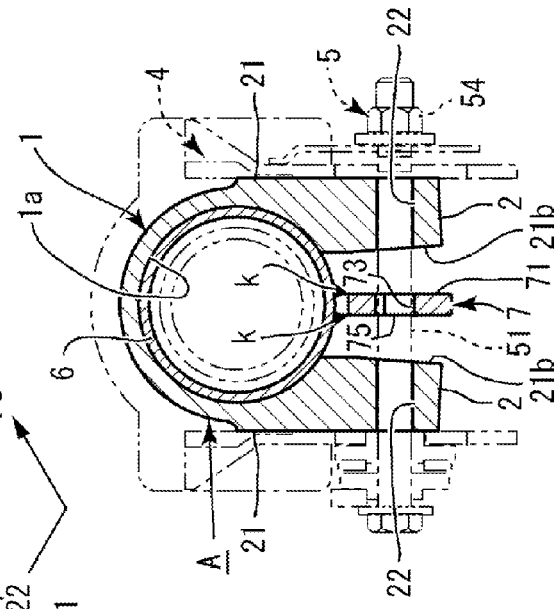

US 9,187,116 B2

STEERING APPARATUS

BACKGROUND OF THE INVENTION

1. Field of the Invention

The present invention relates to a steering apparatus including a telescopic adjusting mechanism and an impact absorbing mechanism for a secondary collision and allowing the mechanisms to be shared by the same member, the steering apparatus further allowing a telescopic holding operation and an impact absorbing operation to be performed independently so as not to affect each other.

2. Description of the Related Art

Various steering apparatuses are present which include a telescopic adjusting mechanism and an impact absorbing apparatus configured to protect a driver at the time of a secondary collision when a collision accident occurs. As one common structure of a steering apparatus of this kind, a conventional technique is disclosed in which, at the time of a secondary collision, a bracket moves along a slot against the pressing force of a clamping bolt.

Furthermore, an effect is conventionally used in which the slot in the bracket is formed to be smaller than the diameter of the clamping bolt so that, when a predetermined load acts on the bracket, the bracket moves while the edge of the slot is being collapsed by the clamping bolt. One of such conventional techniques as illustrated above is disclosed in Japanese Patent Application Laid-open No. 2002-337699.

Japanese Patent Application Laid-open No. 2002-337699 will be described in brief. To be distinguished from the description of the present invention, the description of Japanese Patent Application Laid-open No. 2002-337699 uses parenthesized reference numerals. A steering apparatus in Japanese Patent Application Laid-open No. 2002-337699 has a second upper bracket (22) welded to a column (2) at an upper end of the second upper bracket (22) and which moves in conjunction with the column relative to a vehicle body when the column (2) moves relative to the vehicle body as a result of an impact.

Furthermore, the second upper bracket (22) is sandwiched between opposite walls (21a and 21b) of a first upper bracket (21) fixed to the vehicle body so as to be slidable relative to the vehicle body. Threaded shafts (51) with heads (51') with lateral axes are inserted in first through-holes (41) formed in the opposite sidewalls (21a and 21b) of the first upper bracket (21) and in second through-holes (42) formed in opposite sidewalls (22a and 22b) of the second upper bracket (22). The threaded shaft (51) has a nut (54) screw threaded over the shaft (51) via a washer (52) and a lever (53) integrated with the nut (54).

In Japanese Patent Application Laid-open No. 2002-337699, when clamping is performed using the levers of the threaded shafts (51) with the heads (51)', the opposite sidewalls (22a and 22b) of the second upper bracket (22) with a telescopic adjusting section and an energy absorbing section formed thereon come into pressure contact with the opposite sidewalls (22a and 22b) of the first upper bracket (21). That is, the opposite sidewalls (22a and 22b) of the second upper bracket 22 serve as surfaces fractioned against the opposite sidewalls (21a and 21b) of the first upper bracket (21).

In other words, both the telescopic adjusting section and the energy absorbing section are used by a single member. Thus, in a clamped (locked) state following completion of telescopic adjustment, the second upper bracket (22) is subjected to a sandwiching pressure from the first upper bracket (21).

Thus, an energy absorbing operation in Japanese Patent Application Laid-open No. 2002-337699 definitely involves not only a structure in which "the impact is absorbed based on the advancement of the threaded shaft (51) from a shaft standby area (42b) into an impact absorbing area (42a), which pushes the second through-hole (42) open to plastically deform the second upper bracket (22)" but also the sandwiching pressure from the first upper bracket (21) as described above. In other words, the sandwiching pressure from the first upper bracket (21) sandwiching the second upper bracket (22) between the sidewalls has a significant effect on the operation of absorbing an impact load at the time of a secondary collision.

In these circumstances, in setting of the load of impact absorption at the time of a secondary collision, it is necessary to sufficiently consider a frictional load on the frictional surface resulting from the sandwiching pressure from the first upper bracket (21) as well as resistance offered to the threaded shaft (51) by the impact absorbing area (42a) during relative movement. Thus, setting the energy absorbing load is extremely difficult.

Furthermore, in Japanese Patent Application Laid-open No. 2002-337699, at the time of impact absorption, the threaded shaft (51) moves from the shaft standby area (42b) into the impact absorbing area (42a) in such a way as to push the impact absorbing area (42a) open, thus plastically deforming the second upper bracket (22). A portion collapsed in the plastically deformed area may stick out between the lateral sidewalls (21a and 21b) of the first upper bracket (21) and the lateral sidewalls (22a and 22b) of the second upper bracket (22). When the sticking-out portion is rubbed against the frictional surface, the impact absorbing load increases. The shape, amount, direction, and the like of the portion sticking out due to plasticity vary depending on the impact. Thus, controlling the energy absorbing load with the effect on the frictional surface taken into account is difficult. Hence, setting the desired energy absorbing load is difficult.

An object of the present invention (a technical problem to be solved by the invention) is to provide a steering apparatus which includes a telescopic adjusting mechanism and an impact absorbing mechanism for a secondary collision and which allows these mechanisms to be shared by the same member, the steering apparatus preventing a telescopic holding operation and an impact absorbing operation from affecting each other.

SUMMARY OF THE INVENTION

Thus, the inventors made earnest studies in order to accomplish the above-described object. Then, the inventors have successfully achieved the object by providing a first embodiment of the present invention which is a steering apparatus including: a column pipe; an outer column including an embracing main body portion that allows the column pipe to freely move in a front-rear direction and fixes the column pipe and clamping portions that extend and contract the embracing main body portion in a diametric direction; a fixing bracket having a fixing side portion that holds widthwise opposite sides of the outer column in a sandwiching manner; a stopper bracket including an telescopic slot secured to the column pipe and positioned on a front side and an impact absorbing slot positioned on a rear side and having a collapse portion that absorbs an impact at a time of a secondary collision, the telescopic slot and the impact absorbing slot being contiguously formed along an axial direction; and a clamper having a bolt shaft inserted through the clamping portions, the fixing side portion, and the stopper bracket and collapsing the collapse portion, wherein the stopper bracket is disposed between the clamping portions and is separated from the clamping portions when the outer column is clamped using the clamper.

The object has been accomplished by providing a second embodiment of the present invention which is the steering apparatus according to the first embodiment in which the collapse portion of the stopper bracket is formed as a partitioning projecting piece positioned between the telescopic slot and the impact absorbing slot, and the partitioning projecting piece is bent by a collision with the bolt shaft at the time of a secondary collision. The object has been accomplished by providing a third embodiment of the present invention which is the first embodiment in which the collapse portion of the stopper bracket is formed by setting a vertical width dimension of the impact absorbing slot to be smaller than a diameter of the bolt shaft.

The object has been accomplished by providing a fourth embodiment of the present invention which is the steering apparatus according to the second or third embodiment in which the stopper bracket has a first hanging plate-like portion and a second hanging plate-like portion extending along an axial direction of the column pipe and disposed at a predetermined distance in the diametric direction, the telescopic slot, the impact absorbing slot, and the collapse portion are formed in the first hanging plate-like portion, and a slot through which the bolt shaft is freely inserted and is relatively movable is formed in the second hanging plate-like portion.

The object has been accomplished by providing a fifth embodiment of the present invention which is the steering apparatus according to the second embodiment in which the stopper bracket has a first hanging plate-like portion and a second hanging plate-like portion extending along an axial direction of the column pipe and disposed at a predetermined distance in the diametric direction, the telescopic slot, the impact absorbing slot, and the partitioning projecting piece are formed in each of the first and second hanging plate-like portions, and the partitioning projecting pieces of the first and second hanging plate-like portions are positioned differently from each other in a front-rear direction. The object has been accomplished by providing a sixth embodiment of the present invention which is the steering apparatus according to the fifth embodiment in which the partitioning projecting piece of the first hanging plate-like portion differs in size in a height direction from the partitioning projecting piece of the second hanging plate-like portion.

The object has been accomplished by providing a seventh embodiment of the present invention which is the steering apparatus according to the second or fifth embodiment in which substantially circular cutout-like groove portions are formed at a vehicle body front-side end portion of the telescopic slot and near a vehicle body front-side root of the partitioning projecting piece, a circular base portion of a cushioning member formed of both the base portion and a tail portion extending outward is fitted in each of the cutout-like groove portions, and the tail portion comes into abutting contact with the partitioning projecting piece side along the partitioning projecting piece side.

The object has been accomplished by providing an eighth embodiment of the present invention which is the steering apparatus according to the second or third embodiment in which the stopper bracket includes one hanging plate-like portion extending along the axial direction of the column pipe, and the telescopic slot, the impact absorbing slot, and the collapse portion are formed in the hanging plate-like portion.

According to the present invention, the stopper bracket is disposed between the clamping portions and is separated from the clamping portions and prevented from contacting the clamping portions of the outer column when the outer column is clamped using the clamper. Thus, when clamping is performed using the lever, no friction occurs between each of the clamping portions of the outer column and the stopper bracket.

This enables separate setting and management of a load resulting from collapse of the collapse portion at the time of a collision between the bolt shaft of the clamper and the collapse portion and a frictional load resulting from a telescopic holding force. Furthermore, as described above, the stopper bracket is separated from the clamping portions, and a void is formed between each of the clamping portions and the stopper bracket. Thus, at the time of a secondary collision, even if the portion in the collapse portion sticks out toward the clamping portion due to deformation resulting from collapse of the collapse portion, the portion in the collapse portion and the clamping portion can be prevented from coming into contact with or interfering with each other. This prevents an increase in frictional load at the time of a secondary collision. Consequently, in addition to the frictional load, the collapsing load on the collapse portion imposed by the bolt shaft can be independently set, allowing the optimum energy absorbing load to be easily designed (set).

BRIEF DESCRIPTION OF THE DRAWINGS

FIG. 3B is an enlarged cross-sectional view of an important part of the first embodiment in a clamped state as seen from the front.

FIG. 5A is a side view of an important part depicting that a cushioning member is installed in a telescopic slot in the stopper bracket, FIG. 5B is an enlarged view of a (f) portion in FIG. 5A, FIG. 5C is a cross-sectional view taken along lie X3-X3 in FIG. 5B, FIG. 5D is a perspective view of the cushioning member, FIG. 5E is a cross-sectional view taken along line Y4-Y4 in FIG. 5D, and FIG. 5F is a partially cross-sectional enlarged view of an important part depicting that a partitioning projecting piece is collapsed along with the cushioning member;

FIG. 7A is a perspective view of an important part of a second embodiment of the present invention, and FIG. 7B is a cross-sectional view taken along line Y5-Y5 in FIG. 7A.

DESCRIPTION OF THE PREFERRED EMBODIMENTS

Embodiments of the present invention will be described based on the drawings. The present invention has a plurality of embodiments, and a first embodiment will be described first. A "front side" and a "rear side" are present herein as terms representing directions according to the present invention. The front side and the rear side are based on a front-rear direction of a car in which a steering apparatus according to the present invention is installed. Specifically, with respect to components of the steering apparatus, a front wheel side of the car corresponds to the front side, and a steering wheel 8 side corresponds to the rear side.

Figure 1A:
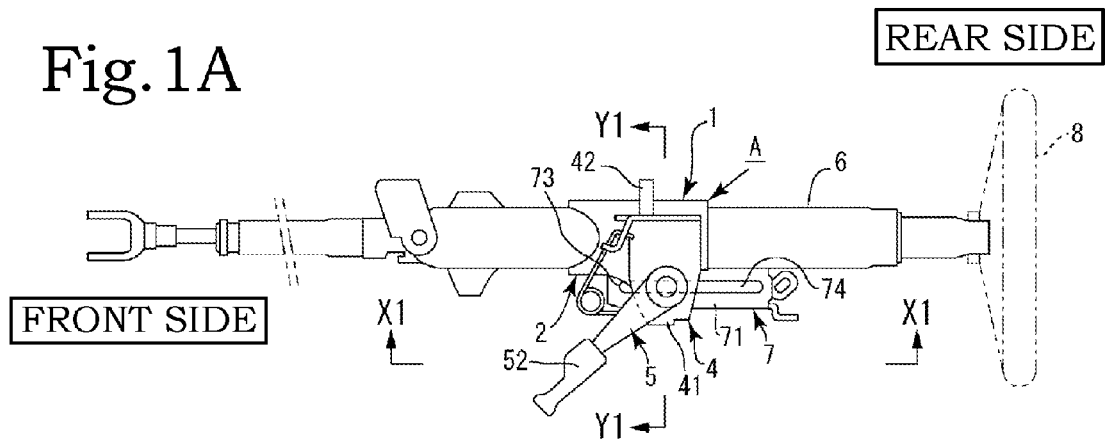
FIG. 1A is a side view of a first embodiment of the present invention.

As depicted in FIG. 1, main components of the present invention include an outer column A, a fixing bracket 4, a clamper 5, a column pipe 6, and a stopper bracket 7. The outer column A includes an embracing main body portion 1 and a clamping portion 2. The embracing main body portion 1 is shaped generally like an internally hollow cylinder. Specifically, the embracing main body portion 1 internally has an embracing inner-peripheral side surface portion 1a formed to be hollow. A slit portion 11 is formed on a lower side of the embracing main body portion 1 in a diametric direction thereof [see FIGS. 2B and 2C and FIGS. 3A and 3B].

Figure 3A:
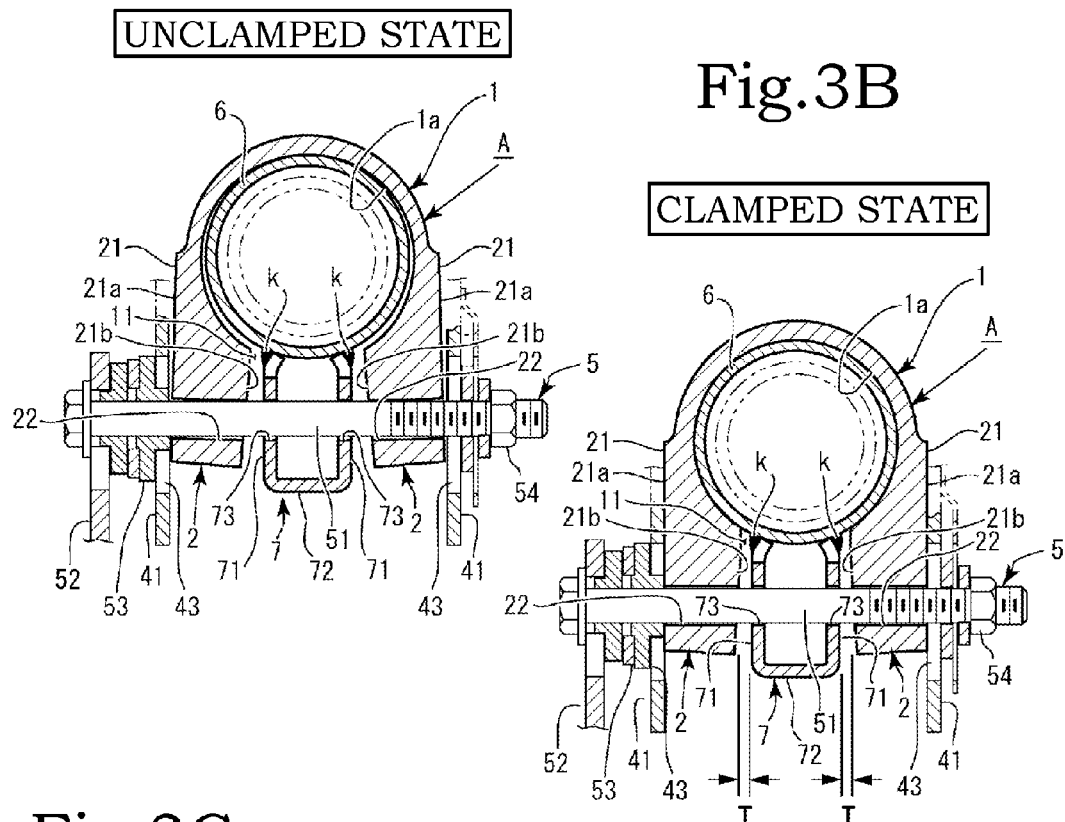
FIG. 3A is an enlarged cross-sectional view of an important part of the first embodiment in an unclamped state as seen from the front.

The slit portion 11 is a widthwise discontinuous gap portion of the embracing main body portion 1 extending from a front side to a rear side along an axial direction of the embracing main body portion 1 [see FIGS. 3(A) and 3(B)]. Edge portions of the slit portion 11 located opposite each other in the width direction approach each other to reduce the diameter of the embracing inner-peripheral side surface portion 1a to clamp and lock (fix) the column pipe 6 housed and installed in the embracing main body portion 1.

The embracing inner-peripheral side surface portion 1a of the embracing main body portion 1 is formed to be slightly larger than the outer diameter of the column pipe 6 in an unlocked state so as to facilitate sliding of the column pipe 6. Furthermore, the embracing main body portion 1 is formed to have a length appropriate to allow an axially approximately intermediate portion of the column pipe 6 to be properly supported in the axial direction. The column pipe 6 projects from an axially front end portion and an axially rear end portion of the embracing main body portion 1.

As depicted in FIG. 1C, FIGS. 2B, 2C, FIGS. 3A, 3B, and other figures, clamping portions 2 are integrally formed at a lower portion of the outer column A. The clamping portions 2 are laterally symmetric and are formed integrally at the positions of opposite ends of the slit portion 11 in the width direction. Specifically, the clamping portions 2 are thick plate like portions substantially hanging from the widthwise opposite ends of the slit portion 11 or positions near the widthwise opposite ends.

Furthermore, the clamping portion 2 is shaped like a vertical plate on the axially front side of the embracing main body portion 1. Additionally, the clamping portion 2 is shaped like a block on the axially rear side of the embracing main body portion 1. The clamping portion 2 has a plate thickness up to the positions of horizontally diametrically opposite ends of the embracing main body portion 1. In addition, the clamping portion 2 may have, on the axially rear side thereof, a widthwise dimension slightly larger than the outer peripheral diameter of the embracing main body portion 1.

Thick portions on the axially rear side of the clamping portions 2 are hereinafter referred to as connected portions 21. Outer surfaces of the connected portions 21 are hereinafter referred to as outer side surfaces 21a. Furthermore, opposite inner surfaces of the clamping portions 2 are hereinafter referred to as inner side surfaces 21b. The outer side surface 21a is a flat surface. With the clamping portions 2 sandwiched between fixing side portions 41 of the fixing bracket 4, the fixing side portion 41 can come into contact with the outer side surface 21a of the connected portion 21. Clamping through-holes 22 are formed in the connected portions 21 along a direction orthogonal to the axial direction of the outer column A and parallel to the horizontal diametric direction of the embracing main body portion 1.

Figure 1B:
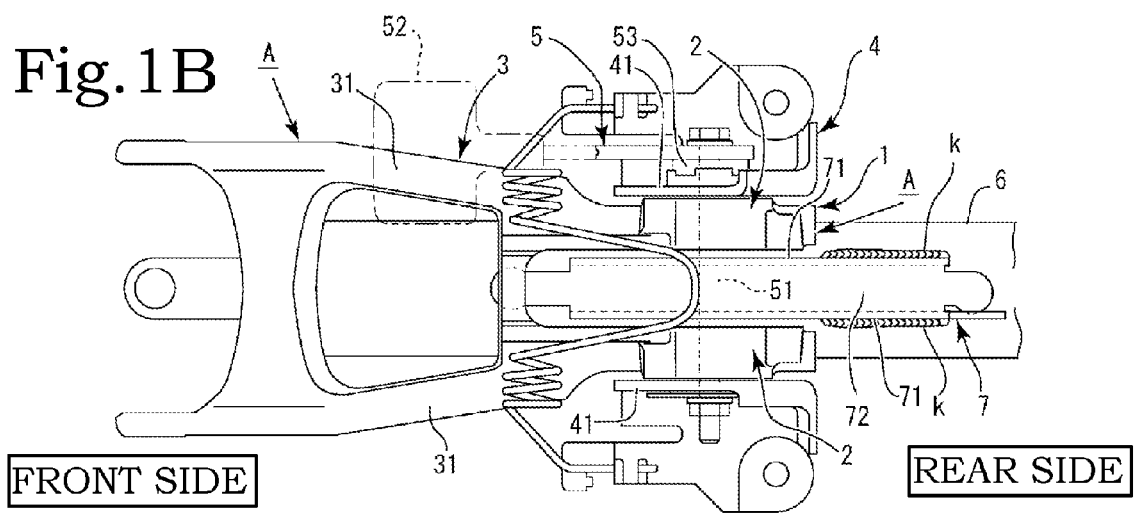
FIG. 1B is an enlarged cross-sectional view taken along line X1-X1 in FIG. 1A.
Figure 1C:
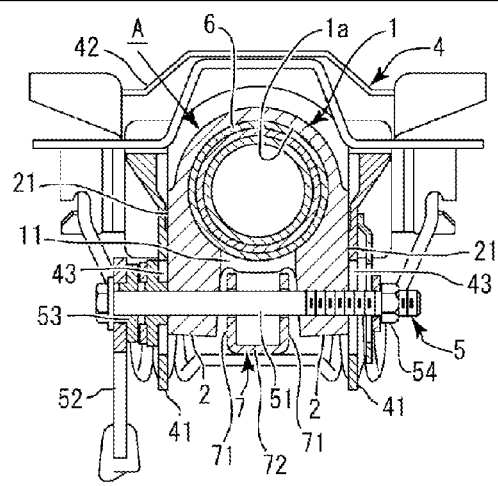
FIG. 1C is an enlarged cross-sectional view taken along line Y1-Y1 in FIG. 1A.
Figure 2A:
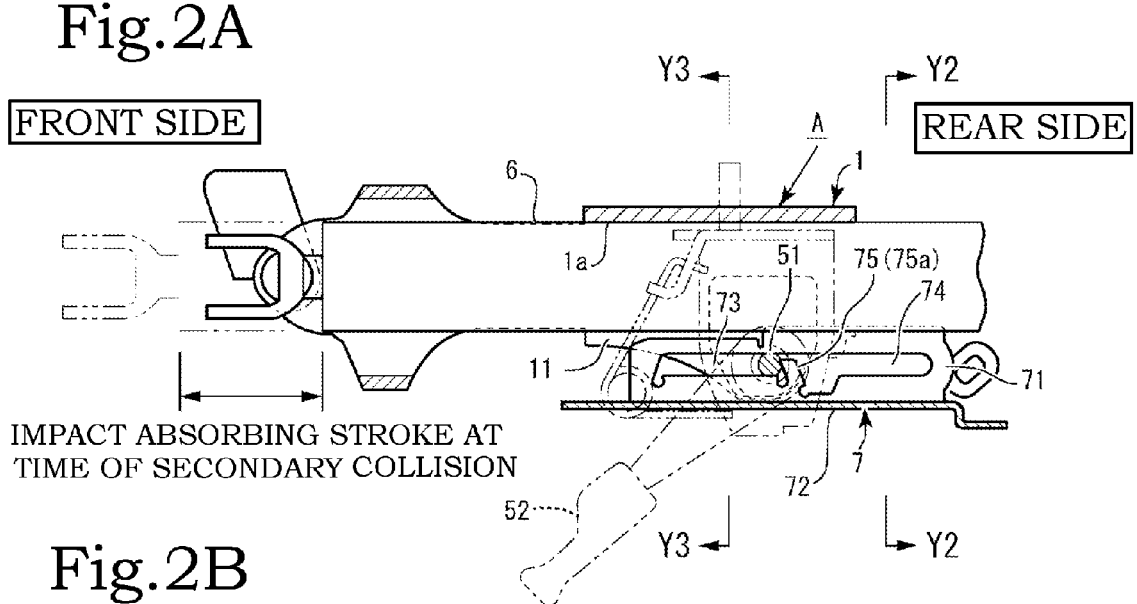
FIG. 2A is a partially cross-sectional enlarged side view of an important part of the first embodiment of the present invention.
Figure 2B:
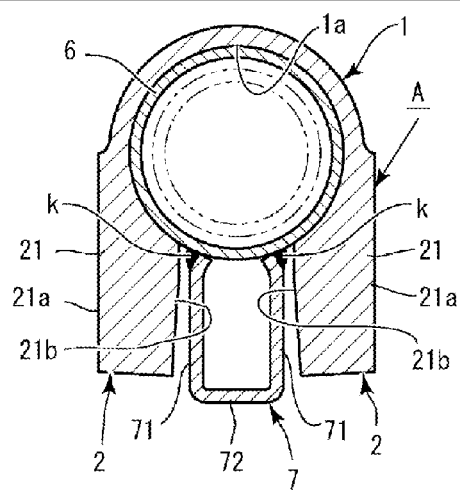
FIG. 2B is an enlarged cross-sectional view taken along line Y2-Y2 in FIG. 2A.
Figure 2C:
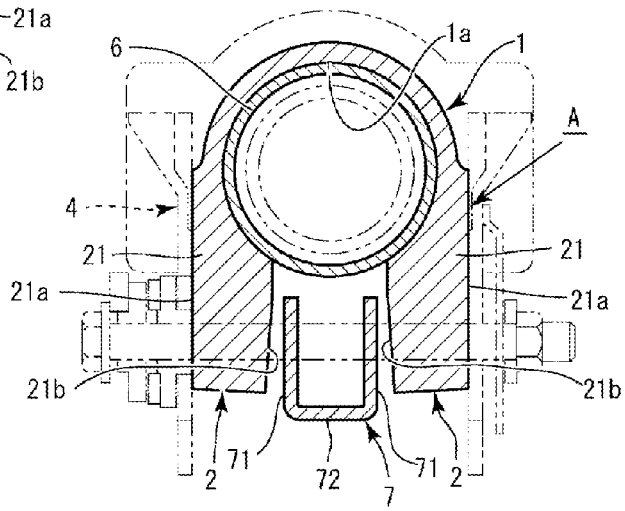
FIG. 2C is an enlarged cross-sectional view taken along line Y3-Y3 in FIG. 2A.
Figure 3C:
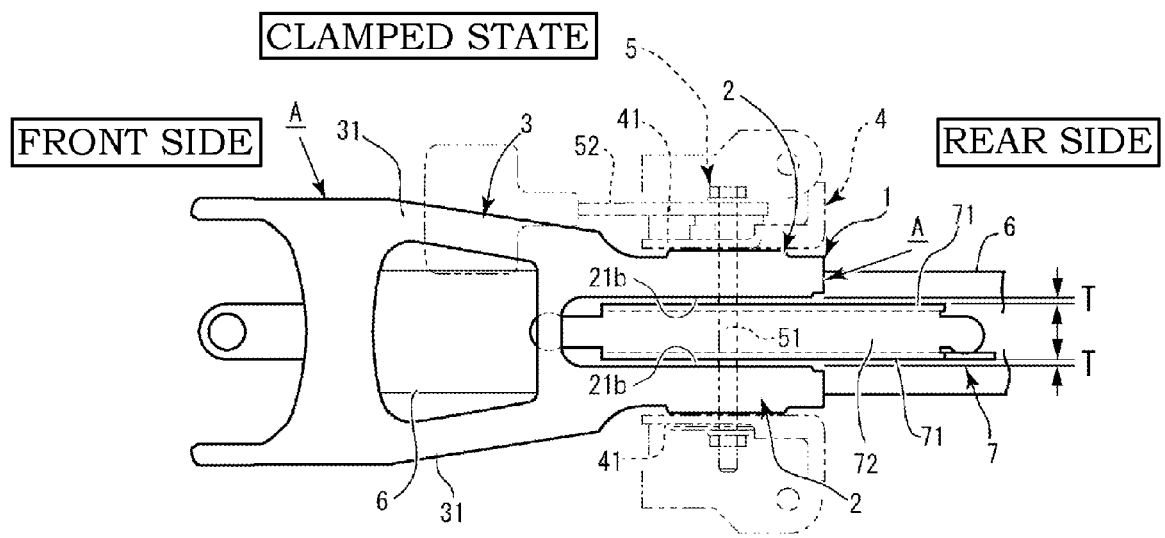
FIG. 3C is a bottom view of an outer column with a column pipe installed therein.

As depicted in FIG. 1B and FIG. 3C, an arm portion 3 is formed on the front-rear wise front side of the embracing main body portion 1. The arm portion 3 includes two arm-like portions 31 disposed so as to be bifurcated. A coupling portion 32 is formed closer to front side ends of the arm portions 31 so as to serve as a bridge between the arm portions 31. The coupling portion 32 is generally circular, and the column pipe 6 is inserted therethrough.

The fixing bracket 4 includes the fixing side portions 41 formed on axially opposite sides of the fixing bracket 4 and a mounting top portion 42. Adjustment holes 43 that are long in a substantially up-down direction or vertical direction are formed in the fixing side portions 41 [see FIGS. 1B and 1C].

The clamper 5 includes a bolt shaft 51, a lock lever portion 52, a clamping cam 53, and a nut 54 [see FIGS. 1B, 1C, 3A, and 3B]. The clamper 5 is installed via the nut 54 along with the lock lever portion 52 and the clamping cam 53. An intermediate portion of a steering shaft is installed inside the column pipe 6. The steering wheel 8 is installed at a tip of the steering shaft projecting from a rear side of the column pipe 6.

The stopper bracket 7 includes two hanging plate-like portions 71 and a bottom plate portion 72. The hanging plate-like portions 71 of the stopper bracket 7 extend along the axial direction of the column pipe 6 and are disposed parallel to each other at a predetermined distance from each other on a lower side of the column pipe 6 in the diametric direction. Upper ends of the hanging plate-like portions 71 are secured to the column pipe 6. The bottom plate portion 72 is formed at lower ends of the hanging plate-like portions 71. The hanging plate-like portions 71 and the bottom plate portion 72 form a generally inverted gate shaped or an angled U shaped cross section that is orthogonal to the longitudinal direction.

Figure 4A:
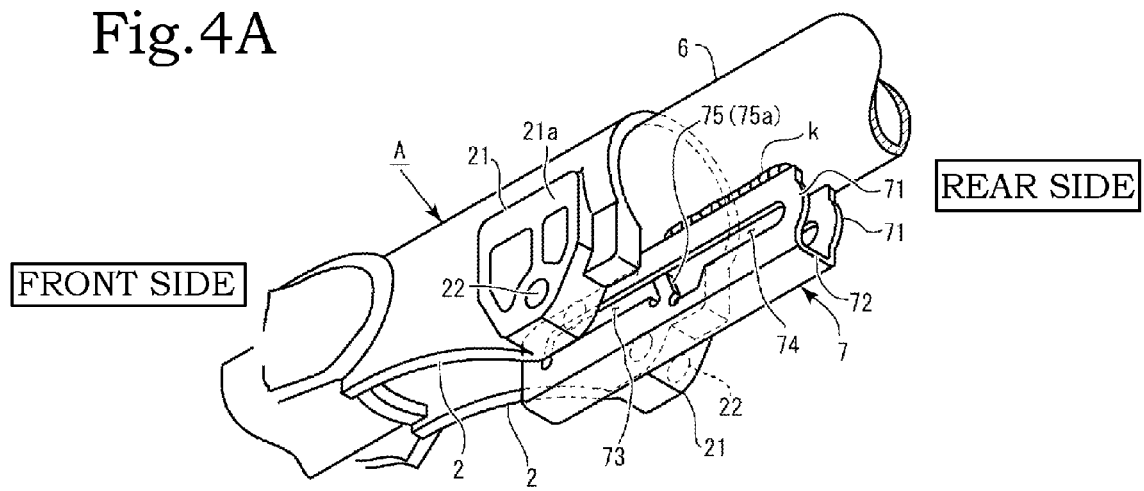
FIG. 4A is a perspective view of an important part of the first embodiment of the present invention including a stopper bracket with a first type of a collapse portion.
Figure 4B:
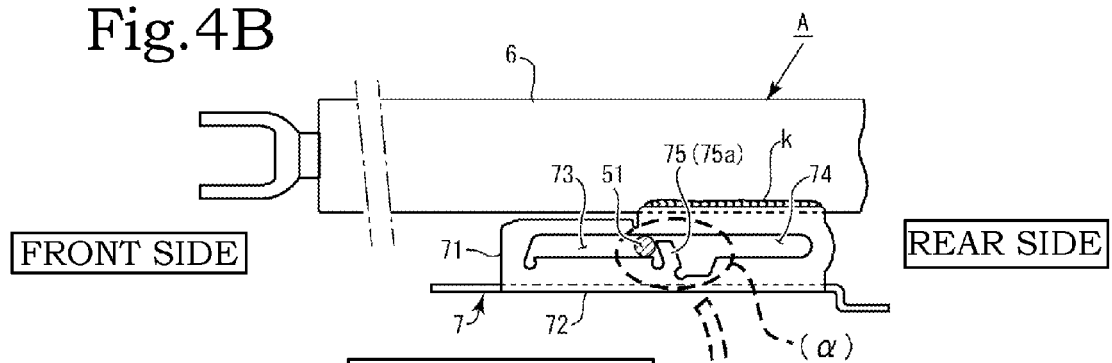
FIG. 4B is a side view of an important part including the column pipe and the stopper bracket.
Figure 4C:
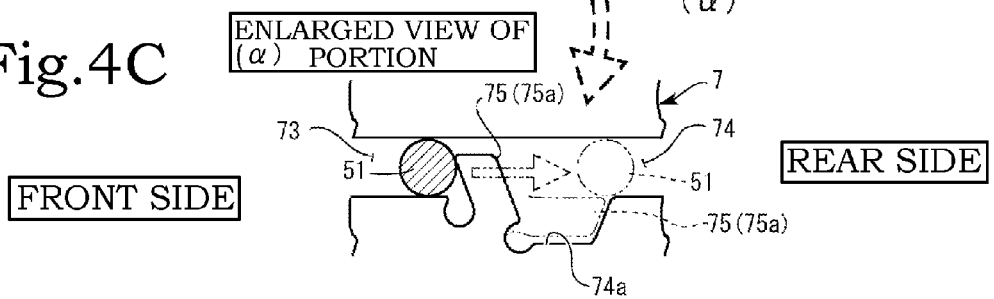
FIG. 4C is an enlarged view of an (a) portion in FIG. 4B.
Figure 4D:
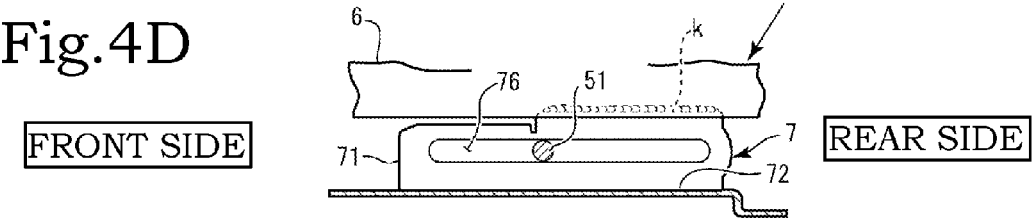
FIG. 4D is a partially cross-sectional side view of a hanging plate-like portion positioned opposite a hanging plate-like portion in FIG. 4B.

A telescopic slot 73 and an impact absorbing slot 74 are formed in one of the hanging plate-like portions 71. A slot 76 through which the bolt shaft 51 of the clamper 5 is freely inserted and is relatively movable is formed in the other hanging plate-like portion 71 [see FIG. 4C]. The telescopic slot 73 is a portion used for telescopic adjustment. The impact absorbing slot 74 is a portion used when the steering column moves forward at the time of a secondary collision.

The impact absorbing slot 74 has a collapse portion 75 that, while being collapsed, keeps absorbing an impact when impacted by the bolt shaft 51 of the clamper 5 at the time of a secondary collision. Two types of collapse portions 75 are present. A first type of the collapse portion 75 is formed as a partitioning projecting piece 75a between the telescopic slot 73 and the impact absorbing slot 74 (see FIG. 4).

The partitioning projecting piece 75a is shaped like a shaft or a rod and formed so as to project from one end side to the other end side in the up-down direction (direction orthogonal to the longitudinal direction) of the impact absorbing slot 74. Specifically, the partitioning projecting piece 75a is formed so as to project from a lower end side to an upper end side of the impact absorbing slot 74 [see FIGS. 4A, 4B, and 4C]. Alternatively, in contrast, the partitioning projecting piece 75a may be formed so as to project from the upper end side to the lower end side of the impact absorbing slot 74 (this is not depicted in the drawings). Alternatively, longitudinally opposite ends of the partitioning projecting piece 75a may be formed continuously from a lower end side to an upper end side of the impact absorbing slot 74 (this is not depicted in the drawings).

The collapse portion 75 is collapsed by the pressing force of the bolt shaft 51 at a secondary collision. When the collapse portion 75 is collapsed, the partitioning projecting piece 75a falls down from a root portion thereof. In other words, when the bolt shaft 51 brings the partitioning projecting piece 75a down, the impact is absorbed. Thus, a recess portion 74a is formed behind a portion of the impact absorbing slot 74 where the partitioning projecting piece 75a is formed so that, when the partitioning projecting piece 75a falls down, the partitioning projecting piece 75a is housed in the recess portion 74a.

The recess portion 74a has a shape approximately comparable to the shape of the brought-down partitioning projecting piece 75a. When the partitioning projecting piece 75a is brought down and housed in the recess portion 74a, the neighborhood of front side of the impact absorbing slot 74 is generally flat, allowing the bolt shaft 51 to move smoothly up to a rear end portion of the impact absorbing slot 74. The projecting length of the partitioning projecting piece 75a is approximately half to four-fifths of the vertical width of the partitioning projecting piece 75a.

Figure 6A:
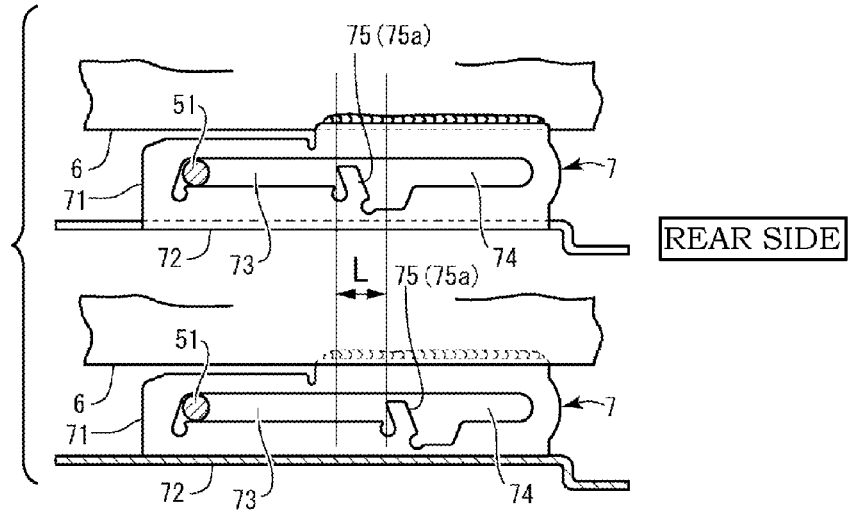
FIG. 6A is a side view of an embodiment in which partitioning projecting pieces of respective hanging plate-like portions of the stopper bracket are provided at different positions.

An embodiment is present in which, when the stopper bracket 7 includes two hanging plate-like portions 71, the telescopic slot 73, the impact absorbing slot 74, and the partitioning projecting piece 75a are formed in each of the hanging plate-like portions 71. For the first hanging plate-like portion 71 and the second hanging plate-like portion 71, the partitioning projecting pieces 75a differ from each other in front-rear wise (axial) position, in other words, the partitioning projecting pieces 75a are separated from each other in the front-read direction (axial direction) [see FIG. 6A]. The wise distance (separation size), in the front-rear direction (axial direction), between the partitioning projecting pieces 75a is denoted by L in the drawings [see FIG. 6A].

Figure 6B:
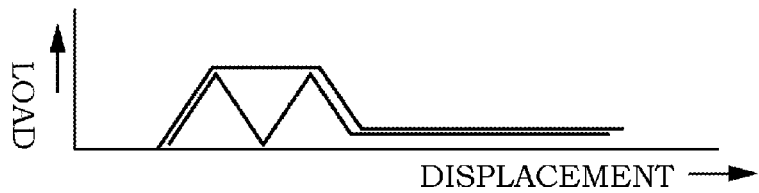
FIG. 6B is a graph depicting an impact energy absorbing state in the configuration in FIG. 6A.

Specifically, in the configuration in which the partitioning projecting pieces 75a differ from each other in front-rear wise (axial) position, the axial position of the partitioning projecting piece 75a formed in the first hanging plate-like portions 71 is forward of the axial position of the partitioning projecting piece 75a formed in the second hanging plate-like portion 71. In this case, at the time of a collision, the bolt shaft 51 collapses the partitioning projecting piece 75a formed in the first hanging plate-like portions 71, and an amount of time later, collapses the partitioning projecting piece 75a formed in the second hanging plate-like portion 71 at a rearward distance (separation size) L from the partitioning projecting piece 75a formed in the first the hanging plate-like portions 71. Thus, at the time of a secondary collision, the time when the bolt shaft 51 comes into abutting contact with each of the partitioning projecting pieces 75a varies, allowing a peak loading time to be maintained [see FIG. 6B].

Figure 6C:
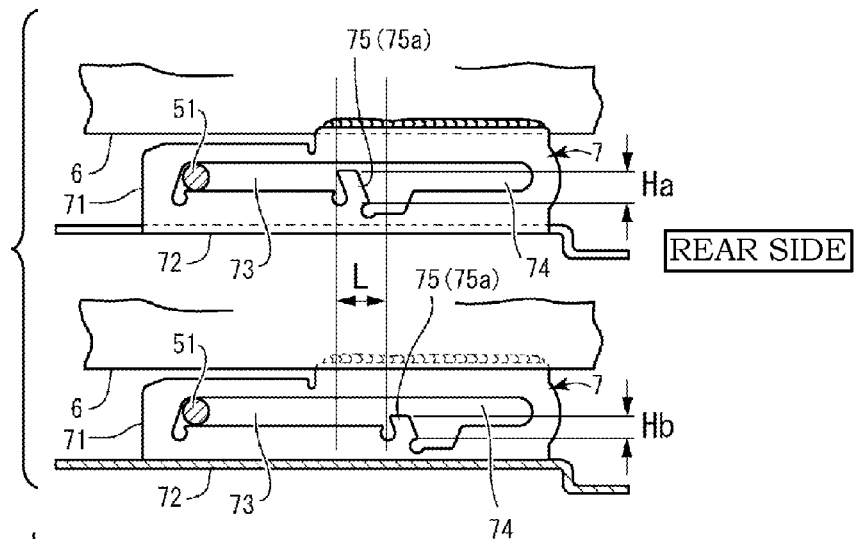
FIG. 6C is a side view of an embodiment in which the partitioning projecting pieces of the respective hanging plate-like portions of the stopper bracket are provided at different positions and at different heights.
Figure 6D:
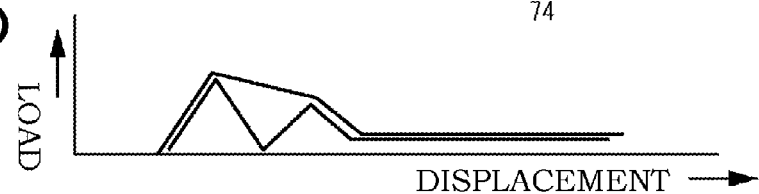
FIG. 6D is a graph depicting the impact energy absorbing state in the configuration in FIG. 6C.

Moreover, the partitioning projecting pieces 75a of the hanging plate-like portions 71 may be set to differ from each other in front-rear wise position and in height wise dimension [see FIG. 6C]. The height wise dimension of the partitioning projecting piece 75a refers to the height or length dimension from the root portion. In this regard, the height of the partitioning projecting piece 75a of the first hanging plate-like portion 71 is denoted by Ha. The height of the partitioning projecting piece 75a of the second hanging plate-like portions 71 is denoted by Hb. The height dimension Hb is set to be smaller than the height dimension Ha [see FIG. 6C]. When the partitioning projecting pieces 75a are differ from each other in height wise dimension, a load following the peak load can be restrained from being extremely low without increasing the peak load [see FIG. 6D].

For example, when the height Hb of the second partitioning projecting piece 75a is smaller than the height Ha of the first partitioning projecting piece 75a, in other words, when the front-rear wise (axially) rear side partitioning projecting piece 75a is lower than the front side partitioning projecting piece 75a, the bolt shaft 51 imposes a higher load on the front side partitioning projecting piece 75a and a lower load on the rear side partitioning projecting piece 75a. The collapsing load at the time of a secondary collision gradually decreases [see FIG. 6D].

The range of adjustment of the peak load can be widened by appropriately setting the sizes of the partitioning projecting pieces 75a or the difference in axial position between the partitioning projecting pieces 75a as described above. Furthermore, for the first hanging plate-like portion 71 and the second hanging plate-like portion 71, the partitioning projecting pieces 75a may be disposed at the same position in the front-rear direction (axial direction).

Cutout-like groove portions 73a are formed at the respective opposite ends of the telescopic slot 73, and a cushioning member 9 such as rubber is installed in each of the cutout-like groove portions 73a (see FIG. 5). Specifically, the cutout-like groove portions 73a are generally circular. One of the cutout-like groove portions 73a is formed at a vehicle body front-side end portion of the telescopic slot 73, whereas the other cutout-like groove portion 73a is formed near a vehicle body front-side root of the partitioning projecting piece 75a.

The cushioning member 9 is shaped like the comma "" or the number "6" and includes a circular base portion 91 and a tail portion 92 with a thickness decreasing as the tail portion 92 extends from the base portion 91. A fitting groove 93 is formed in the cushioning member 9. The cushioning member 9 is installed by fitting the fitting groove 93 in the cutout-like groove portion 73a. The fitting groove 93 is formed along a circular outer periphery of the base portion 91. A bottom surface of the fitting groove 93 is circular along a circumferential direction of the fitting groove 93. Moreover, the fitting groove 93 is linearly shaped along the extending direction of the tail portion 92 [see FIG. 5E].

A base portion 91 side of the fitting groove 93 is fitted in the cutout-like groove portion 73a [see FIGS. 5B and 5C]. A tail portion 92 side of the fitting groove 93 is fitted in a part (specifically, the front side edge) of the partitioning projecting piece 75a [see FIG. 5B]. During telescopic adjustment, when the bolt shaft 51 collides against the partitioning projecting piece 75a, the base portion 91 and the tail portion 92 of the cushioning member 9 absorb the impact of the collision.

Moreover, at the time of a secondary collision of a car, the circumferential fitting groove 93 of the base portion 91 of the cushioning member 9 rotates along the cutout-like groove portion 73*a*. Thus, the tail portion 92 can rotate with the base portion 91. When the bolt shaft 51 collapses the partitioning projecting piece 75*a* so as to bring the partitioning projecting piece 75*a* down rearward, the tail portion 92 also moves in a fall-down direction along with the partitioning projecting piece 75*a* [see FIG. 5F]. This prevents obstruction to the collapse of the partitioning projecting piece 75*a* effected by the bolt shaft 51, allowing the impact to be reliably absorbed.

Figure 8A:
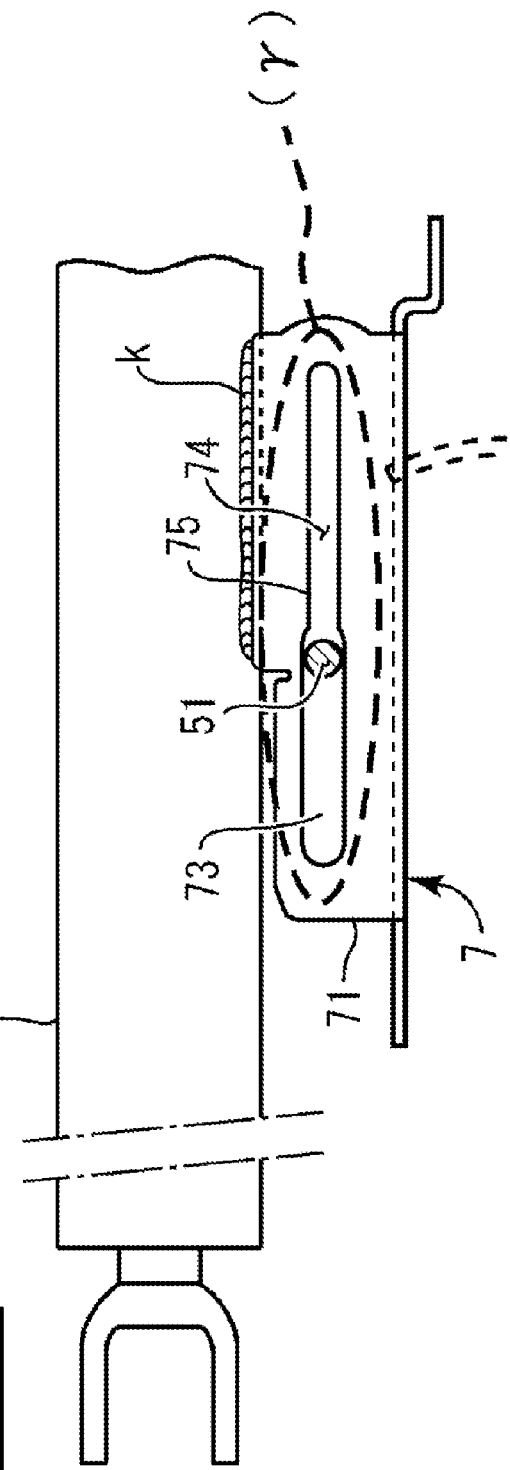
FIG. 8A is a side view of an important part including a stopper bracket with a second type of the collapse portion and a column pipe.
Figure 8B:
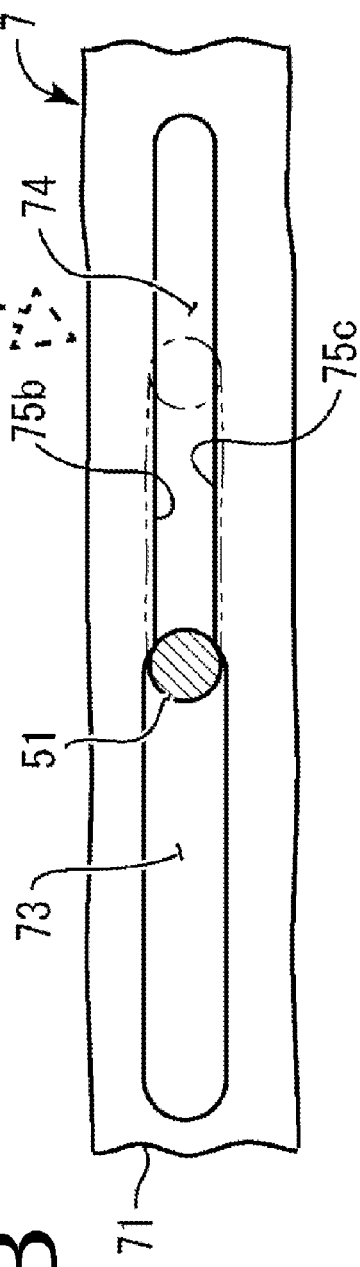
FIG. 8B is an enlarged view of a (y) portion in FIG. 8A.

A second type of the collapse portion 75 is such that the impact absorbing slot 74 has a vertical width dimension smaller than the diameter of the bolt shaft 51 (see FIG. 8). In other words, the collapse portion 75 is formed as a vertically upper end side 75*b* and a vertically lower end side 75*c* of the impact absorbing slot 74. The distance between the upper end side 75*b* and the lower end side 75*c* is smaller than the diameter of the bolt shaft 51. Thus, at the time of a secondary collision, the bolt shaft 51 relatively moves rearward while collapsing the collapse portion 75 in such a way as to squeeze the upper end side 75*b* and the lower end side 75*c*, absorbing the impact.

Furthermore, the second type may be such that the collapse portion 75 is collapsed by squeezing only one of the upper and lower end sides 75*b* and 75*c* of the impact absorbing slot 74. Specifically, only the lower end side 75*c* (or the upper end side 75*b*) is collapsed.

Since the distance between the upper end side 75*b* and the lower end side 75*c* is smaller than the diameter of the bolt shaft 51, at the time of a secondary collision, the bolt shaft 51 relatively moves rearward while collapsing the collapse portion 75 in such a way as to squeeze the upper end side 75*b* and the lower end side 75*c*, absorbing the impact. In an alternative embodiment, the partitioning projecting piece 75*a* may be formed between the telescopic slot 73 and the impact absorbing slot 74, and moreover, the vertical width dimension of the impact absorbing slot 74 may be set to be smaller than the diameter of the bolt shaft 51.

The stopper bracket 7 is secured to the column pipe 6 as described above, and welding is used as securing means. The welding is applied to between a diametrically lower end side of the column pipe 6 and upper ends of the hanging plate-like portions 71. The welding may be applied to the upper ends of the hanging plate-like portions 71 all along the axial direction of the column pipe 6. However, the welding is preferably applied axially from a substantially intermediate position to the rear side of the hanging plate-like portion 71. The portion of the stopper bracket 7 secured by welding is hereinafter referred to as the welded portion k.

Furthermore, when the rear side of the stopper bracket 7 with respect to the intermediate position thereof is welded to the column pipe 6, a thermal stress on the column pipe 6 is lower than when the welding is applied all over the axial direction of the stopper bracket 7. Thus, high machining accuracy can be maintained.

Additionally, the welded portion k is present above the collapse portion 75 and the impact absorbing slot 74 along the axial direction of the impact absorbing slot 74. This prevents deformation of the stopper bracket 7 at the time of a secondary collision when a heavy load is imposed, allowing stable impact absorption. In addition, no junction is formed above the telescopic slot 73, and a void portion is formed between the telescopic slot 73 and the column pipe 6. This increases the degree of freedom of layout.

Now, assembly of the main components of the present invention will be described. The column pipe 6 is embraced in the embracing inner-peripheral side surface portion 1*a* of the embracing main body portion 1 of the outer column A. The stopper bracket 7 secured to the column pipe 6 is placed between the clamping portions 2 of the outer column A. The clamping portions 2 of the outer column A are sandwiched between the fixing side portions 41 of the fixing bracket 4. The bolt shaft 51 is allowed to penetrate the adjustment holes 43 in the fixing side portions 41, the clamping through-holes 22 formed in the clamping portions 2, and the telescopic slot 73 in the stopper bracket 7. The bolt shaft 51 is installed via the nut 54 along with the lock lever portion 52 and the clamping cam 53.

The thickness of the clamping cam 53 is changed in the axial direction of the bolt shaft 51 by a pivoting operation of the lock lever portion 52. The pivoting operation of the lock lever portion 52 exerts a load of clamping on the whole clamper 5 thereby tightening together the fixing side portions 41 of the fixing bracket 4. Both the clamping portions 2 are pressed by the fixing side portions 41 and then clamped by the clamper 5.

Thus, the gap of the slit portion 11 of the embracing main body portion 1 of the outer column A is reduced to lock (fix) axially the column pipe 6 installed in the outer column A. At this time, the embracing inner-peripheral side surface portion 1*a* of the outer column A contacts an outer peripheral side surface of the column pipe 6. A frictional force exerted between the embracing inner-peripheral side surface portion 1*a* and the column pipe 6 is increased to fix the column pipe in the axial direction.

Moreover, when the clamping with the clamper 5 is cancelled, the distance between the fixing side portions 41 is increased to simultaneously increase the distance between the clamping portions 2 [see FIG. 3A]. The locking of the column pipe 6 via the outer column A is cancelled to allow the column pipe 6 to move in the axial direction, enabling telescopic adjustment. At the same time, the outer column A may perform tilt adjustment by moving up and down relative to the adjustment holes 43 in the fixing side portions 41 of the fixing bracket 4 in conjunction with the bolt shaft 51 of the clamper 5.

The stopper bracket 7 is disposed between the clamping portions 2 of the outer column A. When the outer column A is clamped using the clamper 5, the clamping portions 2 approach each other, whereas the stopper bracket 7 is separated from the clamping portions 2 [see FIGS. 3B and 3C].

In other words, the hanging plate-like portions 71 of the stopper bracket 7 are separated from the respective inner side surfaces 21*b* of the clamping portions 2 and prevented from contacting the respective inner side surfaces 21*b*. When the clamping portions 2 are clamped by the clamper 5 and maximally approach each other, a gap T is present between each of the hanging plate-like portions 71 and the corresponding one of the inner side surfaces 21*b* [see FIGS. 3B and 3C].

In the above-described configuration, when the outer column A is clamped using the clamper 5, the hanging plate-like portions 71 of the stopper bracket 7 are separated from the respective inner side surfaces 21*b* of the clamping portions 2 and prevented from contacting the respective inner side surfaces 21*b*. Thus, when clamping is performed using the lever, no friction occurs between each of the clamping portions 2 of the outer column A and the stopper bracket 7.

Thus, each of the clamping portions 2 of the outer column A and the stopper bracket 7 are prevented from affecting each other and can perform independent operations. This enables separate setting and management of a load resulting from collapse of the collapse portion 75 at the time of a secondary collision between the bolt shaft 51 of the clamper 5 and the collapse portion 75 and a frictional load resulting from a holding force exerted on the column pipe 6 associated with completion of telescopic adjustment. Furthermore, at the time of a secondary collision, even if a portion resulting from collapse of the collapse portion 75 at the time of a secondary collision sticks out toward the clamping portion 2, the portion in the collapse portion 75 is prevented from coming into contact with the clamping portion 2. Consequently, in addition to the frictional load, the collapsing load on the collapse portion 75 imposed by the bolt shaft 51 can be independently set, allowing the optimum energy absorbing load to be easily designed (set).

Furthermore, since the telescopic slot 73 and the impact absorbing slot 74 are formed only in the first hanging plate-like portion 71 of the stopper bracket 7, during telescopic adjustment, only the first hanging plate-like portion 71 comes into abutting contact with the telescopic slot 73 of the bolt shaft 51. Thus, no time difference occurs between the hanging plate-like portions 71, and telescopic adjustment can be smoothly achieved. Similarly, at the time of a secondary collision, the collapse portion 75 is collapsed by the bolt shaft 51 only in the first hanging plate-like portion 71, no time difference occurs in the impact absorbing operation, and the impact absorption can be reliably achieved.

In a second embodiment of the present invention, the stopper bracket 7 includes one hanging plate-like portion 71 extending along the axial direction of the column pipe 6, and the telescopic slot 73 and the impact absorbing slot 74 are formed in the hanging plate-like portion 71 (see FIG. 7). The second embodiment includes the single hanging plate-like portion 71 that may have a larger plate thickness than each hanging plate-like portion 71 in the first embodiment so as to have a mechanical strength.

In the second embodiment, the configuration of the telescopic slot 73 and the impact absorbing slot 74 is similar to the configuration in the first embodiment. The collapse portion 75 is provided between the telescopic slot 73 and the impact absorbing slot 74. In the second embodiment, the stopper bracket 7 includes the single hanging plate-like portion 71 and may have a smaller dimension in the width direction than the stopper bracket 7 with the two hanging plate-like portions 71 according to the first embodiment. Thus, the second embodiment can easily achieve the configuration in which the stopper bracket 7 is separated from the clamping portions 2 of the outer column A [see FIG. 7B].

In interpretation of the present invention, the present invention should not be limited to the above-described embodiments. Any of various impact absorbing loads can be easily set based on the shape of the impact absorbing slot 74. For example, the embodiments may be appropriately varied and improved by, for example, tapering the impact absorbing slot 74 so that the vertical width dimension of the impact absorbing slot 74 increases rearward, or in contrast, reversely tapering the impact absorbing slot 74 so that the vertical width dimension of the impact absorbing slot 74 decreases rearward.

In the second embodiment, the collapse portion 75 of the stopper bracket is formed between the telescopic slot and the impact absorbing slot as a partitioning projecting piece, and the partitioning projecting piece is bent by a collision with the bolt shaft at the time of a secondary collision. Thus, the impact load can be easily set based on the shape, size, and the like of the partitioning projecting piece. In a third embodiment, the collapse portion 75 of the stopper bracket is formed by setting the vertical width dimension of the impact absorbing slot to be smaller than the diameter of the bolt shaft. Consequently, the impact absorbing structure can further be simplified.

In a fourth embodiment, the telescopic slot and the impact absorbing slot are formed in the first hanging plate-like portion of the stopper bracket, whereas a slot through which the bolt shaft is freely inserted and is relatively movable is formed in the second hanging plate-like portion. Thus, at the time of a secondary collision, impact absorption is carried out only by the first hanging plate-like portion, enabling smooth impact absorption without causing a time difference in the impact absorbing operation.

In a fifth embodiment, the partitioning projecting piece formed in the first hanging plate-like portion differs, in axial (front-rear wise) position, from the partitioning projecting piece formed in the second hanging plate-like portion. This enables an increase in the range of adjustment of the peak load. In a sixth embodiment, the partitioning projecting piece of the first hanging plate-like portion differs, in height wise dimension, from the partitioning projecting piece of the second hanging plate-like portion. Thus, a load following the peak load at the time of impact absorption can be restrained from being extremely low without increasing the peak load.

In a seventh embodiment, generally circular cutout-like groove portions are formed at a vehicle body front-side end portion of the telescopic slot and near a vehicle body front-side root of the partitioning projecting piece. Furthermore, a circular base portion of a cushioning member including the base portion and a tail portion extending outward from the base portion is fitted in each of the cutout-like groove portions. Thus, the cushioning member that absorbs an impact during telescopic adjustment can be easily attached to a predetermined position. The tail portion of the cushioning member is normally disposed along the partitioning projecting piece. The tail portion serves to mitigate an impact to reduce an impact sound at the time of a collision between the bolt shaft and the partitioning projecting piece during telescopic adjustment, improving the feel of operating the telescopic adjustment.

Furthermore, when the car collides, the base portion installed in the generally circular cutout-like groove portion can rotate along the cutout-like groove portion. Thus, at the time of impact absorption, the bolt shaft and the partitioning projecting piece move relative to each other. When the bolt shaft and the partitioning projecting piece collide against each other, the base portion of the cushioning member rotates along the circular cutout-like groove portion to bring both the tail portion and the partitioning projecting piece down rearward, allowing the partitioning projecting piece to be collapsed. Consequently, impact absorption can be reliably achieved without causing the cushioning member itself to act as an obstruction to the collapse of the partitioning projecting piece.

As described above, even in the configuration in which the telescopic slot and the impact absorbing slot are axially contiguously formed, the cushioning member can be mounted so as to definitely distinguish the absorption of an impact during telescopic adjustment from the absorption of an impact at the time of a car collision. Furthermore, the tail portion is disposed along the partitioning projecting piece and is elongate. Thus, even if the base portion fails to rotate along the cutout-like groove portions at the time of a car collision, only the tail portion is deformed in such a manner as to be bent toward the rear side of the vehicle body at the time of impact absorption. Consequently, the bolt shaft can climb over the tail portion to collapse the partitioning projecting piece.

In an eighth embodiment, the stopper bracket includes a single hanging plate-like portion extending along the axial direction of the column pipe, and the telescopic slot and the impact absorbing slot are formed in the hanging plate-like portion. This configuration simplifies the shape of the stopper bracket, enabling simplification of the apparatus as a whole and a reduction in the weight of the apparatus.

What is claimed is:

1. A steering apparatus comprising:
a column pipe;
an outer column including an embracing main body portion that allows the column pipe to freely move in a front-rear direction and fixes the column pipe, and clamping portions that extend and contract the embracing main body portion in a diametric direction;
a fixing bracket having a fixing side portion that holds widthwise opposite sides of the outer column in a sandwiching manner;
a stopper bracket including an telescopic slot secured to the column pipe and positioned on a front side and an impact absorbing slot positioned on a rear side and having a collapse portion that absorbs an impact at a time of a secondary collision, the telescopic slot and the impact absorbing slot being contiguously formed along an axial direction; and
a clamper having a bolt shaft inserted through the clamping portions, the fixing side portion, and the stopper bracket and collapsing the collapse portion,
wherein the stopper bracket is disposed between the clamping portions and is separated from the clamping portions when the outer column is clamped using the clamper.

2. The steering apparatus according to claim 1, wherein the collapse portion of the stopper bracket is formed as a partitioning projecting piece positioned between the telescopic slot and the impact absorbing slot, and the partitioning projecting piece is bent by a collision with the bolt shaft at the time of a secondary collision.

3. The steering apparatus according to claim 2, wherein the stopper bracket comprises a first hanging plate-like portion and a second hanging plate-like portion extending along an axial direction of the column pipe and disposed at a predetermined distance in the diametric direction, the telescopic slot, the impact absorbing slot, and the collapse portion are formed in the first hanging plate-like portion, and a slot through which the bolt shaft is freely inserted and is relatively movable is formed in the second hanging plate-like portion.

4. The steering apparatus according to claim 2, wherein the stopper bracket comprises a first hanging plate-like portion and a second hanging plate-like portion extending along an axial direction of the column pipe and disposed at a predetermined distance in the diametric direction, the telescopic slot, the impact absorbing slot, and the partitioning projecting piece are formed in each of the first and second hanging plate-like portions, and the partitioning projecting pieces of the first and second hanging plate-like portions are positioned differently from each other in a front-rear direction.

5. The steering apparatus according to claim 4, wherein the partitioning projecting piece of the first hanging plate-like portions differs in height wise dimension from the partitioning projecting piece of the second hanging plate-like portion.

6. The steering apparatus according to claim 4, wherein substantially circular cutout-like groove portions are formed at a vehicle body front-side end portion of the telescopic slot and near a vehicle body front-side root of the partitioning projecting piece, a circular base portion of a cushioning member formed of both the base portion and a tail portion extending outward from the base portion is fitted in each of the cutout-like groove portions, and the tail portion comes into abutting contact with the partitioning projecting piece side along the partitioning projecting piece side.

7. The steering apparatus according to claim 2, wherein substantially circular cutout-like groove portions are formed at a vehicle body front-side end portion of the telescopic slot and near a vehicle body front-side root of the partitioning projecting piece, a circular base portion of a cushioning member formed of both the base portion and a tail portion extending outward from the base portion is fitted in each of the cutout-like groove portions, and the tail portion comes into abutting contact with the partitioning projecting piece side along the partitioning projecting piece side.

8. The steering apparatus according to claim 2, wherein the stopper bracket comprises one hanging plate-like portion extending along the axial direction of the column pipe, and the telescopic slot, the impact absorbing slot, and the collapse portion are formed in the hanging plate-like portion.

9. The steering apparatus according to claim 1, wherein the collapse portion of the stopper bracket is formed by setting a vertical width dimension of the impact absorbing slot to be smaller than a diameter of the bolt shaft.

10. The steering apparatus according to claim 9, wherein the stopper bracket comprises a first hanging plate-like portion and a second hanging plate-like portion extending along an axial direction of the column pipe and disposed at a predetermined distance in the diametric direction, the telescopic slot, the impact absorbing slot, and the collapse portion are formed in the first hanging plate-like portion, and a slot through which the bolt shaft is freely inserted and is relatively movable is formed in the second hanging plate-like portion.

11. The steering apparatus according to claim 9, wherein the stopper bracket comprises one hanging plate-like portion extending along the axial direction of the column pipe, and the telescopic slot, the impact absorbing slot, and the collapse portion are formed in the hanging plate-like portion.

* * * * *